United States Patent
Frye et al.

(10) Patent No.: US 12,127,505 B2
(45) Date of Patent: Oct. 29, 2024

(54) METHOD, CONTROL DEVICE AND CONTROL SYSTEM FOR OPERATING AN AGRICULTURAL HARVESTING MACHINE AND AGRICULTURAL HARVESTING MACHINE

(71) Applicant: CLAAS Saulgau GmbH, Bad Saulgau (DE)

(72) Inventors: Simon Frye, Bad Saulgau (DE); Simon Stützle, Bad Saulgau (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 237 days.

(21) Appl. No.: 17/895,777

(22) Filed: Aug. 25, 2022

(65) Prior Publication Data

US 2023/0076800 A1 Mar. 9, 2023

(30) Foreign Application Priority Data

Sep. 9, 2021 (DE) .......................... 102021123418.2

(51) Int. Cl.
*A01D 1/00* (2006.01)
*A01D 41/127* (2006.01)
*A01D 75/18* (2006.01)

(52) U.S. Cl.
CPC ......... *A01D 75/187* (2013.01); *A01D 41/127* (2013.01)

(58) Field of Classification Search
CPC .. A01D 75/187; A01D 41/127; A01D 43/085; A01D 1/00; A01F 29/16
USPC .......................................................... 701/50
See application file for complete search history.

(56) References Cited

U.S. PATENT DOCUMENTS

| | | | | |
|---|---|---|---|---|
| 2006/0174600 A1* | 8/2006 | Behnke | ................ | A01D 75/187 56/10.2 J |
| 2007/0233416 A1* | 10/2007 | Jeppe | ................ | A01D 41/1273 702/187 |
| 2014/0319251 A1* | 10/2014 | Pollklas | ................ | A01F 29/14 241/152.1 |
| 2022/0133729 A1* | 5/2022 | Alam | ................ | A61P 25/28 514/248 |

FOREIGN PATENT DOCUMENTS

| | | |
|---|---|---|
| DE | 102005005736 A1 | 9/2006 |
| DE | 102006015152 A1 | 9/2008 |
| DE | 102010024818 A1 | 12/2010 |
| DE | 102017115465 A1 | 1/2019 |
| DE | 102008054488 | 10/2020 |

OTHER PUBLICATIONS

European Search Report; 2 pages; Feb. 10, 2023—listing only patent numbers.
European Search Report; 2 pages; Dated May 2, 2022.

* cited by examiner

*Primary Examiner* — Shardul D Patel

(57) ABSTRACT

Method for operating an agricultural harvesting machine (1), wherein the agricultural harvesting machine (1) has a working assembly (2) in which a foreign body sensor (19) is installed, wherein a measurement signal provided by the foreign body sensor (19) is evaluated with the aid of a signal analysis in such a manner that the signal analysis is taken as a basis for determining at least one component of the working assembly (2) which has a fault which triggers, in the measurement signal, a signal component which incorrectly causes the presence of a foreign body to be detected.

12 Claims, 2 Drawing Sheets

METHOD, CONTROL DEVICE AND CONTROL SYSTEM FOR OPERATING AN AGRICULTURAL HARVESTING MACHINE AND AGRICULTURAL HARVESTING MACHINE

The invention relates to a method, a control device and a control system for operating an agricultural harvesting machine, and to an agricultural harvesting machine.

DE 10 2011 014 245 A1 discloses an agricultural harvesting machine which is in the form of a forage harvester, has an attachment and has a metal detector as a foreign body sensor. When a metal foreign body is detected in the crop on the basis of the measurement signal from the metal detector, a quick stop can be carried out in order to prevent damage to the working assemblies of the harvesting machine by the foreign body.

Operation of an agricultural harvesting machine with a foreign body sensor may be impaired by virtue of the fact that, on account of interference sources, a measurement signal provided by the foreign body sensor causes the presence of a foreign body to be detected even though there is actually no foreign body in the crop. This may result in the harvesting machine no longer being able to be operated properly. Such interference sources may be caused, for example, by faulty repair or faulty replacement parts which are installed in the harvesting machine. The search for such interference sources is time-consuming and requires the partial dismantling of the harvesting machine. There is a need to simplify the search for such interference sources which trigger, in the measurement signal, signal components which incorrectly cause the presence of a foreign body to be detected.

On the basis of this, the present invention is based on the object of providing a novel method, control device and control system for operating an agricultural harvesting machine and an agricultural harvesting machine having such a control system.

This object is achieved by means of a method for operating an agricultural harvesting machine according to Patent claim 1.

A measurement signal provided by the foreign body sensor is evaluated with the aid of a signal analysis in such a manner that the signal analysis is taken as a basis for determining at least one component of the working assembly which has a fault which triggers, in the measurement signal, a signal component which incorrectly causes the presence of a foreign body to be detected.

With the aid of the present invention, it is proposed for the first time to evaluate the measurement signal provided by the foreign body sensor using a signal analysis in such a manner that the signal analysis is used to determine at least one component of the working assembly which has a fault and therefore an interference source which triggers, in the measurement signal, a signal component which incorrectly causes the presence of a foreign body to be detected.

This makes it possible to automate the search for a fault to the greatest possible extent, with the result that the respective interference source can be determined and repaired or replaced within a short time.

At least a frequency analysis, in particular a frequency and amplitude analysis, is preferably used as the signal analysis. In particular, a frequency or a variable corresponding to the frequency and/or an amplitude or a variable corresponding to the amplitude and/or a duration or a variable corresponding to the duration of the respective signal component is/are determined, wherein these variables are taken as a basis for determining the at least one component of the working assembly which has the fault and therefore the interference source which triggers, in the measurement signal, the respective signal component which incorrectly causes the presence of a foreign body to be detected. This procedure is particularly preferred. The above variables can be taken as a basis for easily and reliably determining the respective component of the working assembly which has the fault causing the incorrect detection of a foreign body and therefore the interference source.

The frequency of signal components of identical amplitude and/or identical duration is preferably determined in the measurement signal, wherein the frequency of the signal components of identical amplitude and/or identical duration is taken as a basis for determining that component of the working assembly which has the respective fault and therefore interference source which triggers, in the measurement signal, the respective signal component which incorrectly causes the presence of a foreign body to be detected. These features are also particularly preferred in order to automatically determine the respective component of the working assembly which has the fault causing the incorrect detection of a foreign body and therefore the interference source.

The control device is defined in Patent claim 6, the control system is defined in Patent claim 8 and the agricultural harvesting machine is defined in Patent claim 10.

Preferred developments of the invention emerge from the subclaims and the following description. Exemplary embodiments of the invention are explained in more detail on the basis of the drawing, without being restricted thereto, in which:

Figure 1:
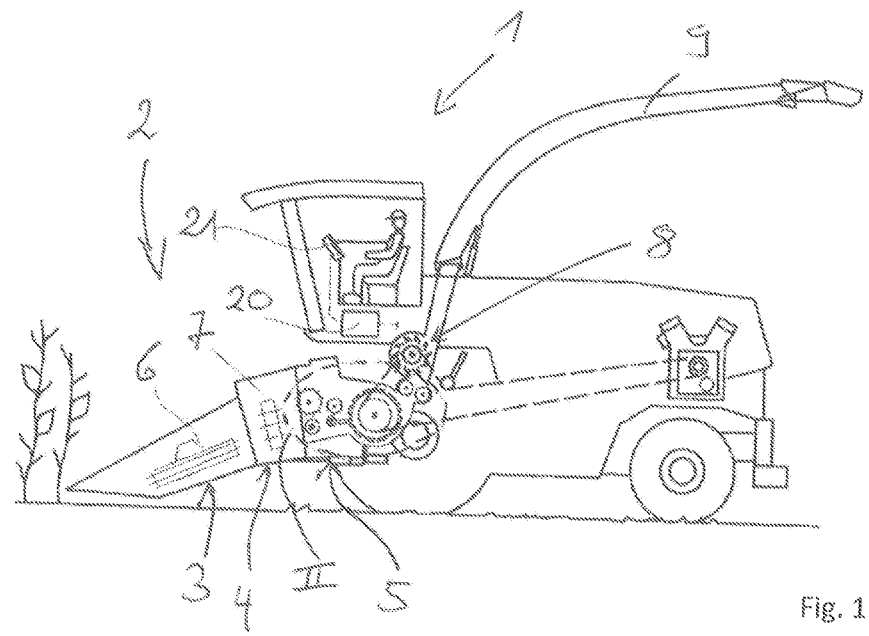
FIG. 1 shows an agricultural harvesting machine having a control device and control system according to the invention.
Figure 2:
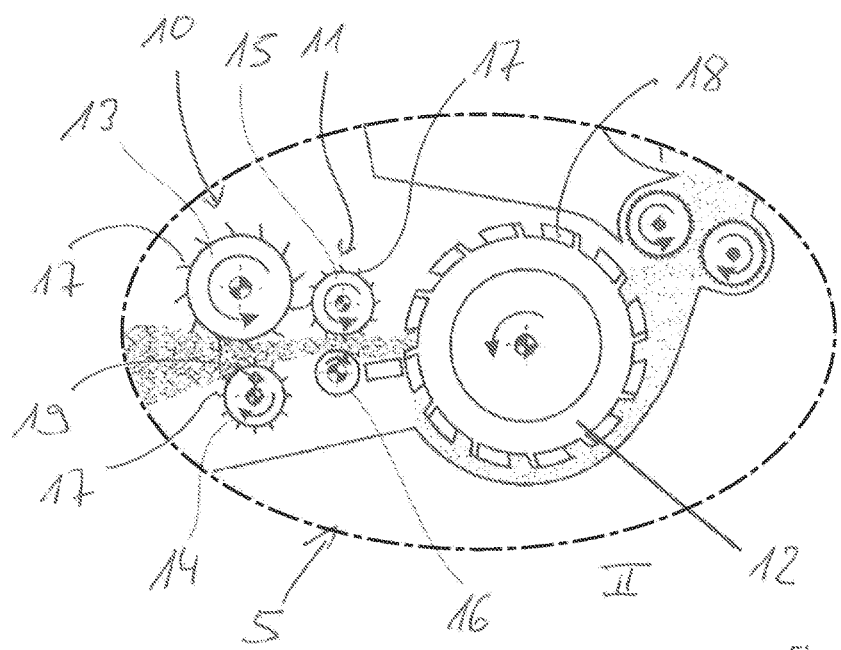
FIG. 2 shows a detail of FIG. 1.

FIG. 1 shows an agricultural harvesting machine 1 which is in the form of a forage harvester and comprises a working assembly 2. The working assembly 2 has an attachment 3 in the form of a maize header, a feeding unit 4 and a chopping unit 5.

Crop to be harvested is separated from subsoil to be treated with the aid of mowing and conveying members 6 of the maize header 3 and is supplied to the chopping unit 5 via a feeding drum 7 of the feeding unit 4.

The crop is shredded in the region of the chopping unit 5 and is conveyed in the direction of a discharge chute 9 via a conveying device 8 arranged downstream of the chopping unit 5. The crop which has been chopped can be discharged in the direction of a transport wagon via the discharge chute 9.

The chopping unit 5 has a front roller pair 10 and a rear roller pair 11, as seen in the transport direction of the crop, which are both positioned in front of a chopping drum 12 of the chopping unit 5, as seen in the transport direction of the crop. The front roller pair 10 comprises a pre-press roller 13 and a transport roller 14. The rear roller pair 11 has a press roller 15 and a further transport roller 16, which is also referred to as a smooth roller. The rollers 13, 14 and 15 in the roller pairs 10 and 11 carry conveyor bars 17. The chopping drum 12 carries chopping blades 18.

A foreign body sensor 19 which can be used to infer the presence of a foreign body in the harvested crop is installed in the working assembly 2, in the region of the front roller pair 10 of the chopping unit 5 in the exemplary embodiment shown. The foreign body sensor 19 is preferably arranged in the lower front transport roller 14.

This foreign body sensor 19 may be a capacitive foreign body sensor or an inductive foreign body sensor, preferably a metal detector.

When a foreign body is detected in the crop on the basis of the measurement signal from the foreign body sensor 19, a quick stop of the working assembly 2 can be carried out. For this purpose, the foreign body sensor 19 transmits a measurement signal to a control device 20 of the agricultural harvesting machine 1 which evaluates the measurement signal from the foreign body sensor 19. On the basis of this evaluation, a corresponding warning message can be displayed to a driver of the agricultural harvesting machine 1 in a display device 21.

According to the invention, the measurement signal provided by the foreign body sensor 19 is evaluated with the aid of a signal analysis, to be precise in such a manner that the signal analysis is taken as a basis for determining at least one component of the working assembly 2 which has a fault and therefore an interference source which triggers, in the measurement signal, a signal component which incorrectly causes the existence of a foreign body to be detected.

For example, on account of faulty repair or the installation of a faulty replacement part for a component of the working assembly 2, the respective component may have an interference source, to which the foreign body sensor 19 which is preferably in the form of a metal detector responds, and which then triggers, in the measurement signal from the foreign body sensor 19, a respective signal component which incorrectly causes the presence of a foreign body to be detected even though there is actually no foreign body in the crop.

The invention makes it possible to automate and therefore simplify the search for such faulty components of the working assembly 2 in order to replace such components and to then enable interference-free operation of the agricultural harvesting machine 1.

At least a frequency analysis, preferably a frequency and amplitude analysis, is used as the signal analysis.

During the signal analysis of the measurement signal from the foreign body sensor 19, a frequency or a variable corresponding to the frequency and/or an amplitude or a variable corresponding to the amplitude and/or a duration or signal width or a variable corresponding to the duration or signal width of the respective signal component, which is present in the measurement signal from the foreign body sensor 19 and incorrectly causes the presence of a foreign body to be detected, is/are determined, wherein these variables are taken as a basis for determining the at least one component of the working assembly 2 which has the fault and therefore the interference source which triggers, in the measurement signal, the respective signal component which incorrectly causes the presence of a foreign body to be detected.

In this case, the invention is based on the knowledge that all rotating components of the working assembly 2 which are installed in the vicinity of the foreign body sensor 19, in particular the rollers 13, 14, 15 and 16 in the roller pairs 10 and 11 and the chopping drum 12, the feeding drum 7 and the mowing and conveying members 6, have individual speeds, with the result that, if there should be a fault in the region of these components which triggers, in the measurement signal, a respective signal component which incorrectly causes the presence of a foreign body to be detected, this signal component can be reliably assigned to the respective component using the frequency or period duration or the temporal spacing of the signal components.

Provision may be made for the frequency of signal components of identical amplitude and/or identical duration to be determined in the measurement signal, wherein the frequency of the signal components of identical amplitude and/or identical duration is then taken as a basis for determining the component of the working assembly 2 which has the respective fault which triggers, in the measurement signal from the foreign body sensor 19, the respective signal component which incorrectly causes the presence of a foreign body to be detected.

Further details are described below with reference to FIGS. 3, 4 and 5, in which case a measurement signal S from the foreign body sensor 19, which is subjected to the signal analysis described above in the control device 20, is respectively shown against time t in FIGS. 3, 4 and 5.

Figure 3:
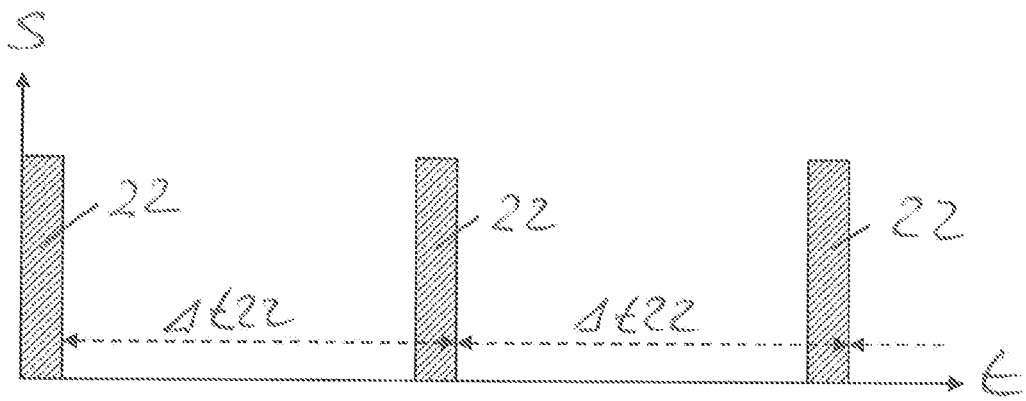
FIG. 3 shows a time diagram for illustrating the invention.

In FIG. 3, the signal components 22 which have an identical amplitude and an identical signal width and a defined period duration $\Delta t22$ are present in the measurement signal S. The period duration $\Delta t22$ or the frequency of the signal components 22 which is dependent thereon can be taken as a basis for determining that component of the working assembly 2 which has a fault and therefore an interference source which causes the signal component 22 which incorrectly causes the presence of a foreign body to be detected. This can be carried out on the basis of the defined speed of the components of the working assembly 2 which differ from one another.

Figure 4:
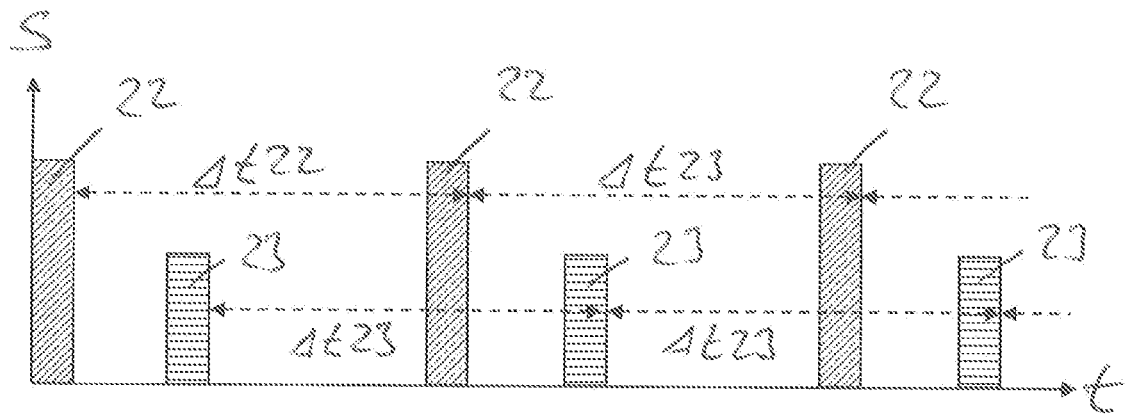
FIG. 4 shows a further time diagram for illustrating the invention.

In FIG. 4, a signal profile of the measurement signal S is plotted against the time t, which signal profile also has the signal components 23 in addition to the signal components 22, wherein the amplitude of the signal components 23 is smaller than the amplitude of the signal components 22. Both the signals 22 and the signals 23 have a defined period duration $\Delta t22$ and $\Delta t23$, respectively, wherein the period durations $\Delta t22$ and $\Delta t23$ are identical in FIG. 4, with the result that both signal components 22, 23 can be assigned to the same component of the working assembly 2, with the result that two faults and therefore two interference sources are therefore present on this component of the working assembly 2 and cause the presence of a foreign body to be detected.

Figure 5:
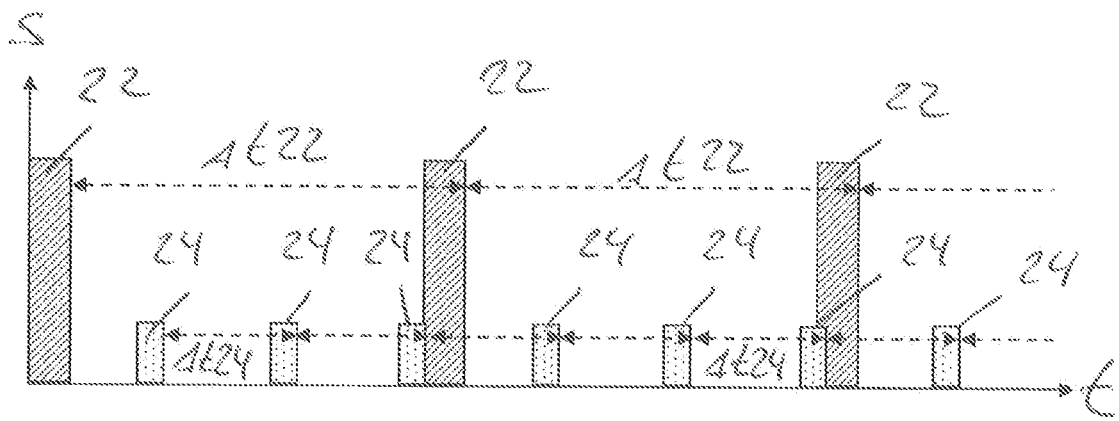
FIG. 5 shows a further time diagram for illustrating the invention.

The signal profile S in FIG. 5 contains, in addition to the signal component 22, the signal component 24 which differs from the signal component 22 both in terms of amplitude and signal width and period duration. The period duration $\Delta t24$ of the signal component 24 is therefore shorter than the period duration $\Delta t22$ of the signal component 22, with the result that the two signal components 22, 24 have different frequencies and are therefore assigned to different components of the working assembly 2. Two components of the working assembly 2 which have a fault or interference source are therefore inferred in FIG. 5.

The invention can be used to easily and reliably determine the component of a working assembly 2 of an agricultural harvesting machine 1 which has a fault and therefore an interference source which impairs the measurement signal from a foreign body sensor 19. Such a fault or interference source may be caused by faulty repair or by the installation of a faulty replacement part, as a result of which the respective component then has a residual magnetism which influences the measurement signal from the foreign body sensor 19, which is preferably in the form of a metal detector, and causes the incorrect detection of the presence of a foreign body.

The invention makes it possible to easily repair the agricultural harvesting machine 1 within a short time by eliminating the determined fault source or interference source on the determined component.

The foreign body sensor 19 is typically segmented, as seen in the transverse direction of the working assembly 2 that runs perpendicular to the harvesting direction of the agricultural harvesting machine 1 and therefore the transport direction of the crop, with the result that it is then possible not only to determine the component of the working assembly 2 which has the respective fault or interference source, but also to determine the axial position of this fault or interference source in the determined component, using the segmentation of the foreign body sensor. This makes it possible to narrow down the spatial position of the fault or interference source in a further automated manner.

The invention also relates to a control device which is configured to automatically carry out the method described above. The control device 20 of the agricultural harvesting machine 1 is therefore configured to evaluate the measurement signal provided by the foreign body sensor 19 with the aid of a signal analysis in such a manner that the signal analysis is taken as a basis for determining at least one component of the working assembly 2 which has a fault which triggers, in the measurement signal, the signal component which incorrectly causes the presence of a foreign body to be detected. This has already been described in detail above.

The invention also relates to a control system of an agricultural harvesting machine which comprises the control device 20 according to the invention and the foreign body sensor 19, wherein the foreign body sensor 19 transmits a measurement signal to the control device 20.

The invention also relates to an agricultural harvesting machine 1 having a working assembly 2 and a control system, as described above. In this case, the foreign body sensor 19 may be arranged in an attachment in the form of a maize header, in the region of the chopping unit 5, in the region of a receiving member in the form of a pickup or the like. The agricultural harvesting machine may be a forage harvester or a loading wagon.

LIST OF REFERENCE SIGNS

1 Agricultural harvesting machine
2 Working assembly
3 Maize header
4 Feeding unit
5 Chopping unit
6 Mowing and conveying member
7 Feeding drum
8 Conveying device
9 Discharge chute
10 Roller pair
11 Roller pair
12 Chopping drum
13 Pre-press roller
14 Transport roller
15 Press roller
16 Transport roller
17 Conveyor bar
18 Chopping blade
19 Foreign body sensor
20 Control device
21 Display device
22 Signal component
23 Signal component
24 Signal component

The invention claimed is:

1. A method for operating an agricultural harvesting machine (1),
   wherein the agricultural harvesting machine (1) has a working assembly (2) in which a foreign body sensor (19) is installed,
   wherein a measurement signal provided by the foreign body sensor (19) is evaluated with the aid of a signal analysis in such a manner that the signal analysis is taken as a basis for determining at least one component of the working assembly (2) which has a fault which triggers, in the measurement signal, a signal component which incorrectly causes the presence of a foreign body to be detected.

2. The method according to claim 1, characterized in that at least a frequency analysis is used as the signal analysis.

3. The method according to claim 1, characterized in that a frequency and amplitude analysis is used as the signal analysis.

4. The method according to claim 1, characterized in that a frequency or a variable corresponding to the frequency and/or an amplitude or a variable corresponding to the amplitude and/or a duration or a variable corresponding to the duration of the respective signal component is/are determined, wherein these variables are taken as a basis for determining the at least one component of the working assembly (2) which has the fault which triggers, in the measurement signal, the respective signal component which incorrectly causes the presence of a foreign body to be detected.

5. The method according to claim 1, characterized in that the frequency of signal components of identical amplitude and/or identical duration is determined in the measurement signal, and in that the frequency of the signal components of identical amplitude and/or identical duration is taken as a basis for determining that component of the working assembly (2) which has the respective fault which triggers, in the measurement signal, the respective signal component which incorrectly causes the presence of a foreign body to be detected.

6. A control device (20) of an agricultural harvesting machine (1),
   wherein the agricultural harvesting machine has a working assembly (2) in which a foreign body sensor (19) is installed,
   wherein the control device (20) is configured to evaluate a measurement signal provided by the foreign body sensor (19) with the aid of a signal analysis in such a manner that the signal analysis is taken as a basis for determining at least one component of the working assembly (2) which has a fault which triggers, in the measurement signal, a signal component which incorrectly causes the presence of a foreign body to be detected.

7. The control device (20) according to claim 6, characterized in that the control device is configured to automatically carry out the method according to claim 1.

8. The control system of an agricultural harvesting machine,
   having a control device (20) according to claim 6,
   having at least one foreign body sensor (19) which is installed in a working assembly (2) of the agricultural harvesting machine (1) and transmits a measurement signal to the control device (20).

9. The control system according to claim 8, characterized in that the foreign body sensor (19) is in the form of an inductive or capacitive sensor, in particular a metal detector.

10. An agricultural harvesting machine (1) having a working assembly (2) and having a control system according to claim 8.

11. The agricultural harvesting machine (1) according to claim 10, wherein the foreign body sensor (19) is installed in a maize header (3) or in a chopping unit (5) of the working assembly (2) of a forage harvester.

12. The agricultural harvesting machine (1) according to claim 10, wherein the foreign body sensor (19) is installed in a receiving member of the working assembly (2) of a forage harvester or of a loading wagon, which receiving member is in the form of a pickup.

* * * * *